Jan. 7, 1930.  G. R. WOOD  1,742,229
PREDETERMINED WEIGHT INDICATING DEVICE FOR SCALES
Filed Aug. 19, 1924
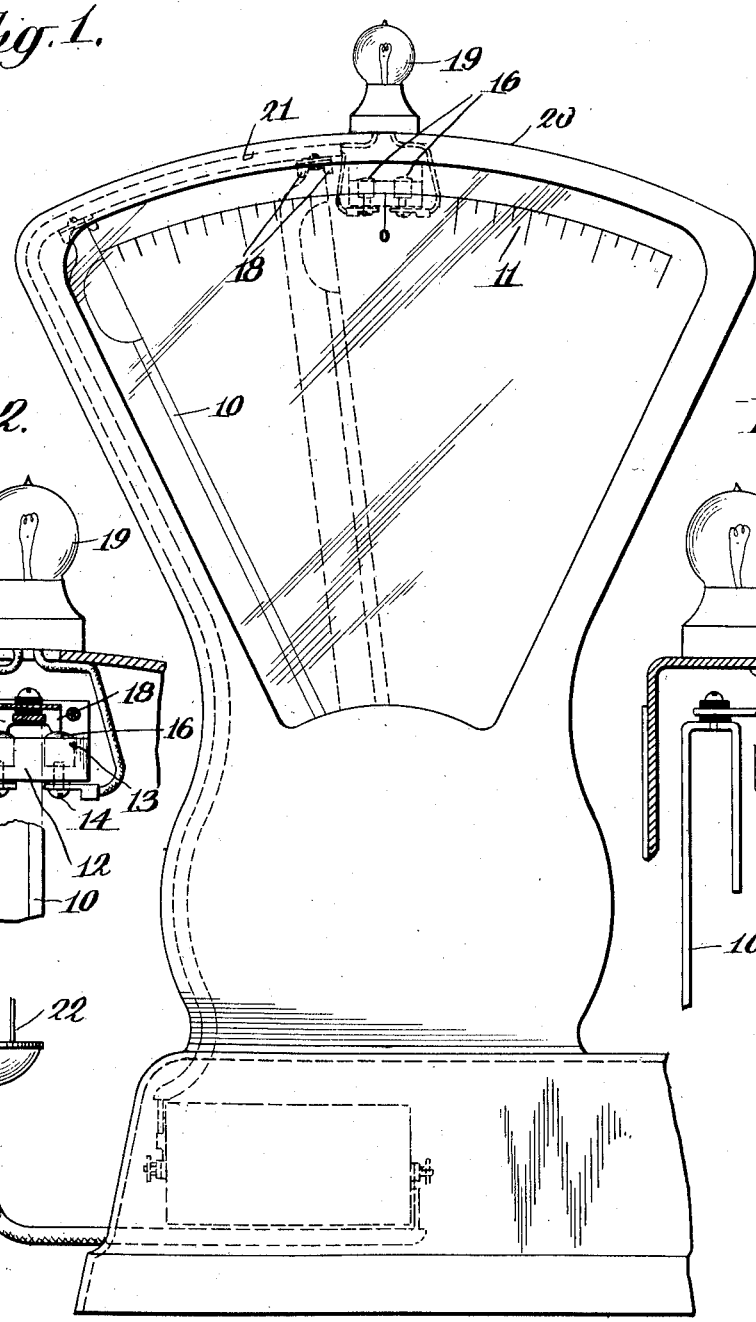
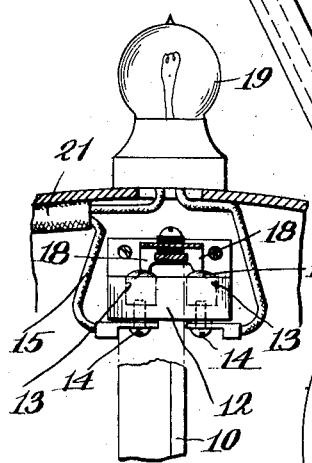
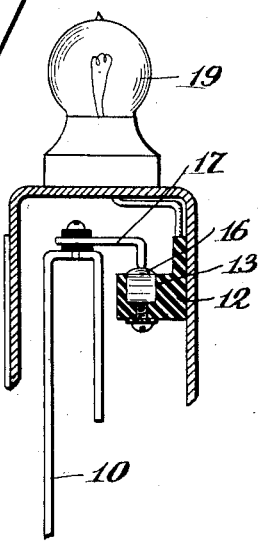
Inventor
G. R. Wood
By his Attorneys
Cooper, Kerr & Dunham Patented Jan. 7, 1930

1,742,229

UNITED STATES PATENT OFFICE

GEORGE R. WOOD, OF NEW YORK, N. Y., ASSIGNOR TO DAYTON SCALE COMPANY, OF DAYTON, OHIO, A CORPORATION OF NEW JERSEY

PREDETERMINED-WEIGHT-INDICATING DEVICE FOR SCALES

Application filed August 19, 1924. Serial No. 733,014.

This invention relates to improvements in weighing scales and is particularly directed to the provision of means for displaying a visible indication when the weighing hand or pointer is in a particular position over the weighing chart.

In weighing and mixing commodities occasion frequently arises where a number of scales are used in a mixing room and it is desirable for a supervisor to be able to determine from a distance whether the operators who are mixing batches of ingredients upon the scales are performing their work in a proper manner. For example, a certain operator may at each operation weigh out two pounds of a certain ingredient. After this two pound weight of a commodity is weighed out he removes the commodity from the weight pan and commences a new weighing operation on another batch of the same commodity. With present scales of the automatic type in order to ascertain whether an operator is performing an operation properly it is necessary for the supervisor to make the weight reading observation himself. This is obviously impracticable where one supervisor is watching the operations of a number of operators.

The present invention is directed to the provision of a suitable means for establishing an electric circuit to a lamp at the top or at some prominent position on the scale housing whereby this lamp will only light up upon the indicator assuming a particular position corresponding to a predetermined load. Provision is made for so establishing the circuit to the indicating lamp that the weighing operation is not interfered with.

In the drawings,

Fig. 1 shows a front view of a scale embodying my invention.

Figs. 2 and 3 are detail views of the contact mechanism.

Generally the scale may be of any desired automatic type. I have here illustrated a scale of the fan type wherein an indicator 10 traverses a weight chart 11. It will be understood that the scale is provided with the usual automatic load counterbalancing mechanism and the usual load support, this being of conventional form need not be illustrated or described. Suitably fixed in the scale housing is a block of insulating material 12. This insulating block upon its upper surface is provided with two cupped depressions 13 which form wells adapted to receive mercury. Extending to these wells are suitable conductors here shown as screws 14 to which wires 15 are adapted to be connected. The mercury is filled in these wells so that the meniscus of the mercury surface projects slightly above the top of the fiber block as clearly indicated at 16 in Fig. 3. Carried by the pivotal indicator 10 and preferably insulated therefrom is a contact member 17 having a pair of contact projections or points 18 (see Fig. 2). The wires 15 lead to a lamp 19 of any desired type mounted at any desired point, as for example, on the top of the scale housing 20. In addition, these wires 15 also extend to a cable 21 which leads to a suitable plug connection 22 which may be plugged in to any proper source of electric current supply.

The operation of the device will be self-evident. When the contact points 18 are in contact with the meniscus of mercury 16, a circuit through the lamp 19 is lighted and the operator or the supervisor observing at a distance remote from the scale will then know that the indicator 10 is at a particular position over the chart 11. In Fig. 1, chart 11 is shown as of the over and under type with zero at the center. Thus the chart may be used to tell the weighing operator whether or not more material is to be added or too much material is applied to the load support.

It will be understood that the indicator will be free at all times to move without restraint and that the drops of mercury afford practically no resistance to the indicator hand. From time to time as the mercury becomes corroded additional mercury can be supplied to the mercury wells, it only being necessary that sufficient mercury be present to cause a more less prominent meniscus 16 of mercury to project above the top fiber block.

It will be understood that the fiber block can be fastened at any desired point in the scale housing so as to close the circuit at the desired point in the indicator travel.

What I claim is—

1. A contact device for a scale adapted to close the circuit of a signal when a predetermined weight is reached, comprising a closed housing, a contact element fixed to the housing in the interior thereof, a member movable within said housing and having a contact element for engaging said first-named contact element only at a predetermined point of its travel.

2. A contact device for a scale adapted to complete a signal circuit when a predetermined weight is reached, comprising a housing having side and top walls, a contact element fixed to one of said side walls inside the housing, a signal mounted on the top wall of the housing on the outside thereof, circuit connections from said contact element to said signal, and a member movably mounted within said housing and adapted to engage said contact element at a predetermined point of its travel.

3. A contact device for a scale adapted to complete a circuit for a signal or the like when a predetermined weight is reached, comprising a closed housing, a pair of contact elements fixed to an interior wall of said housing, a member movable within said housing and having a contact for bridging said pair of contact elements to connect said elements in series in the same circuit.

4. A contact device for a scale adapted to complete a circuit for operating a signal or the like upon a predetermined weight being reached, comprising a closed housing, a pair of contacts fixed to the side of said housing in the interior thereof, a member movable within said housing and having a contact element at its upper end adapted to engage said contacts to connect them in series in a circuit, and an electrical device attached to said housing exteriorly thereof adapted to be operated by said circuit.

5. A device comprising a vertically disposed housing, a pair of contacts fixed to a vertical wall of said housing in the interior thereof and disposed parallel to said vertical wall, and a contact member movable parallel to said wall and inside the housing and adapted to engage said contacts in succession and to bridge said contacts at one point of its travel for closing an electrical circuit.

In testimony whereof I hereto affix my signature.

GEORGE R. WOOD.